United States Patent [19]
Schmidt

[11] Patent Number: 5,417,559
[45] Date of Patent: May 23, 1995

[54] WAX PATTERN MOLD

[75] Inventor: Glenn H. Schmidt, Malibu, Calif.

[73] Assignee: Callaway Golf Company, Carlsbad, Calif.

[21] Appl. No.: 47,470

[22] Filed: Apr. 19, 1993

Related U.S. Application Data

[63] Continuation of Ser. No. 775,852, Oct. 15, 1991, Pat. No. 5,204,046.

[51] Int. Cl.⁶ .................................................. B29C 45/36
[52] U.S. Cl. ........................................ 425/186; 425/188;
425/190; 425/442; 425/468; 425/577;
425/DIG. 10; 249/64; 249/172; 249/184;
164/340; 164/341; 164/342; 164/346
[58] Field of Search .................... 249/64, 142, 170, 171,
249/172, 177, 184, 180, 186; 425/577, 468,
DIG. 10, 441, 442, 188; 164/340, 342, 345, 346

[56] References Cited

U.S. PATENT DOCUMENTS

| | | | |
|---|---|---|---|
| 2,948,031 | 8/1960 | Webb | 164/346 |
| 3,172,667 | 3/1965 | Baker et al. | |
| 3,849,053 | 11/1974 | Bruce et al. | 425/468 |
| 3,856,256 | 12/1974 | Celesti | 425/577 |
| 3,974,997 | 8/1976 | Bolton | 249/184 |
| 4,383,819 | 5/1983 | Letica | |
| 4,420,447 | 12/1983 | Nakashima | 249/172 |
| 4,650,626 | 3/1987 | Kurokawa | |
| 4,731,014 | 3/1988 | Von Holdt | |
| 4,765,585 | 8/1988 | Wieder | 249/64 |
| 4,768,747 | 9/1988 | Williams et al. | 425/468 |
| 4,832,307 | 5/1989 | Watanabe et al. | 249/184 |
| 4,842,243 | 6/1989 | Butler | 425/577 |
| 4,880,047 | 11/1989 | VanRens | 164/340 |
| 4,883,623 | 11/1989 | Nagamoto et al. | |
| 4,993,475 | 2/1991 | Yamada | 249/184 |

FOREIGN PATENT DOCUMENTS 1222407  4/1986  U.S.S.R. .............................. 164/340

Primary Examiner—Khanh Nguyen
Attorney, Agent, or Firm—William W. Haefliger

[57] ABSTRACT

A wax pattern molding process, employing a mold having a cavity and a core structure in the mold cavity that include closing the mold with the core structure positioned in the mold cavity; injecting flowing heated wax into the mold to flow about the core; allowing the injected wax to cool and solidify to form the wax pattern; removing the core structure from the solidified wax pattern, while the mold holds the pattern in position in the mold; and opening the mold and removing the unencumbered wax pattern from the mold.

1 Claim, 6 Drawing Sheets

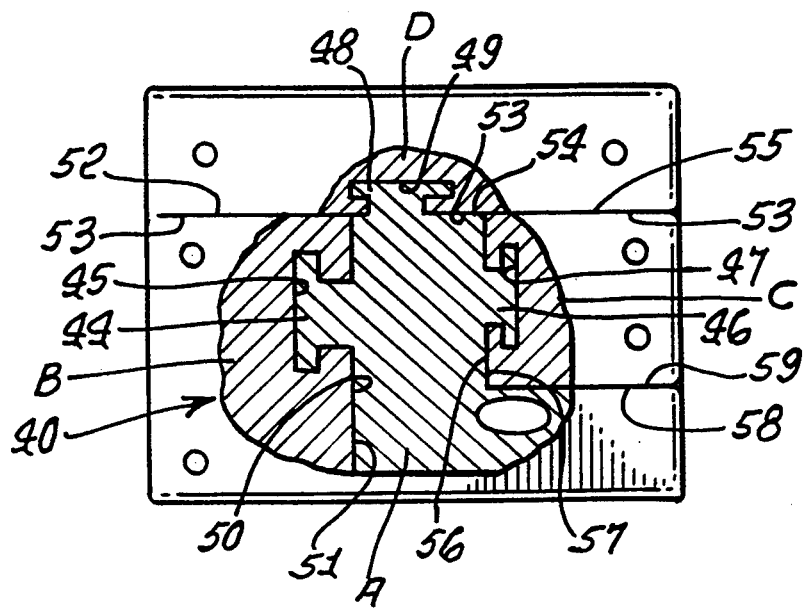
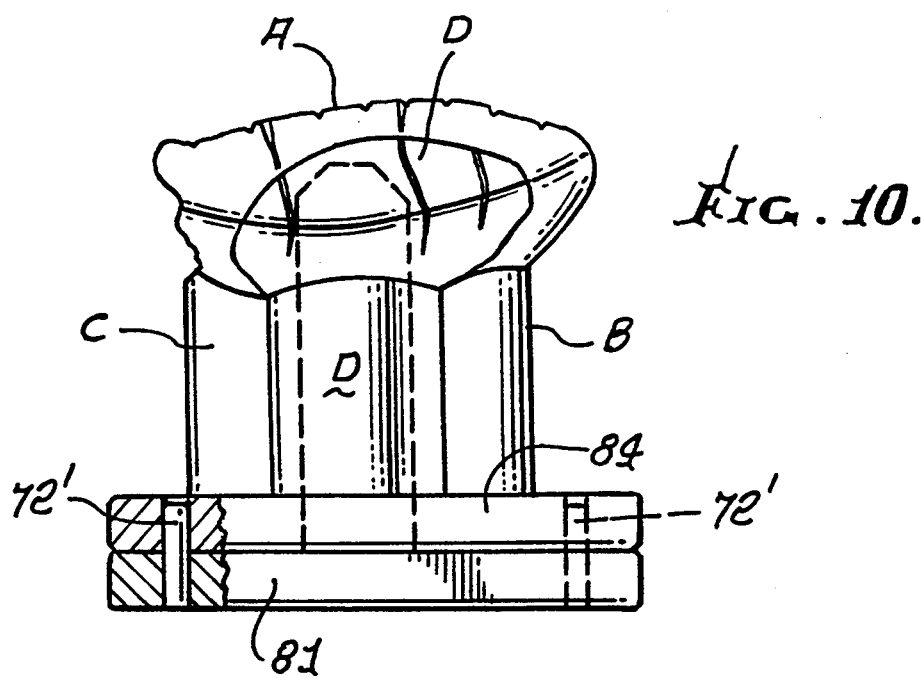
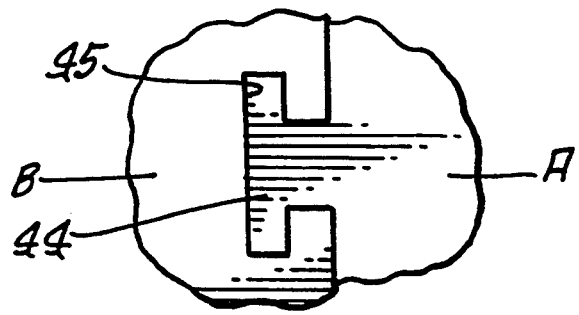

WAX PATTERN MOLD

This is a continuation, of application Ser. No. 775,852 filed Oct. 15, 1991, now U.S. Pat. No. 5,204,046.

BACKGROUND OF THE INVENTION

This invention-relates generally to the forming of wax patterns to be used to form objects, such as golf club heads, as via a lost wax and head casting process; and more particularly, it concerns a method that ensures the thin-walled dimensional integrity of thus formed golf club heads, as by precision formation of the wax pattern.

Currently, golf club heads, as for example "metal wood" hollow heads, are formed to have extremely thin walls, for reasons which include desired enlargement of such heads, facilitating the accurate striking and driving of golf balls. However, the production of such thin-Walled heads is made difficult by the fact that inaccuracies in wall thickness, occurring for example during wax pattern formation, lead to cracking and failure of the heads upon repeated high velocity impact with golf galls. There is need for improvements in wax pattern formation methods which will overcome such problems and difficulties.

SUMMARY OF THE INVENTION

It is a major object of the invention to provide method and apparatus which will overcome such problems and enable high rate or volume production of wax patterns of precision dimensional integrity.

In accordance with the invention, the improved process to produce such wax patterns includes the steps:
a) closing a pattern mold with a core means positioned in the mold cavity,
b) injecting flowing heated wax into the mold to flow about the core,
c) allowing the injected wax to cool and solidify to form the wax pattern,
d) removing the core means from the solidified wax pattern, while the mold cavity structure holds the wax pattern in position within the mold,
e) and opening the mold and removing the unencumbered wax pattern from the mold.

As a result, the core or core parts need not be removed from the delicate, thin-walled pattern after it has been removed from the mold, obviating damage to the pattern.

Typically, and as will be seen, the core means comprises multiple core pieces, and the above d) step includes removing the core pieces from the pattern while it remains fixated in the mold cavity, whereby the pattern becomes a hollow shell while fully stabilized in the mold.

Yet another object is to provide for preliminary positioning of the core in the mold cavity, in wax pattern forming position, with metal-to-metal contact of core-to-mold in all three axes; and as will be seen, the positioning step typically includes providing a flange on the core means, and a stop shoulder on the mold, and wedging a flange against the stop shoulder during the a) step, further locking the core against metal of the mold base, via the flange wedging action, achieving absolute location relative to the cavity geometry. This ensures integrity of wall thickness. Also, the core assembly is typically and advantageously inserted into the mold with core metal-to-mold metal relative sliding guidance. The method is such as to allow removal of the core pieces one-by-one, and unidirectionally from the delicate wax pattern, fixated and stabilized in the mold.

A further object includes providing a mold that includes a base and two covers, to cover different portions of the base, and step d) includes opening one cover to allow the removal of the core pieces from the wax pattern while the pattern remains positioned in the mold. Also, step e) may then include opening the other cover to allow removal of the entire wax pattern from the mold, free of the core pieces which were previously removed.

Finally, the core pieces are typically removed from the pattern via that portion of the pattern which defines an opening which corresponds to the position of a golf club head sole plate, to be separately attached to the cast golf club head.

These and other objects and advantages of the invention, as well as the details of an illustrative embodiment, will be more fully understood from the following specification and drawings, in which:

DRAWING DESCRIPTION

FIG. 9 is a section taken on lines 9—9 of FIG. 6 showing the front side of insert or core structure;

FIG. 10 is a side elevation taken on lines 10—10 of FIG. 8;

FIG. 11 is an enlarged fragmentary view showing a T-connection (of insert or core parts) as also seen in FIG. 9;

FIG. 13 is a perspective view of a wax pattern produced by use of the mold structure.

DETAILED DESCRIPTION

Figure 1:
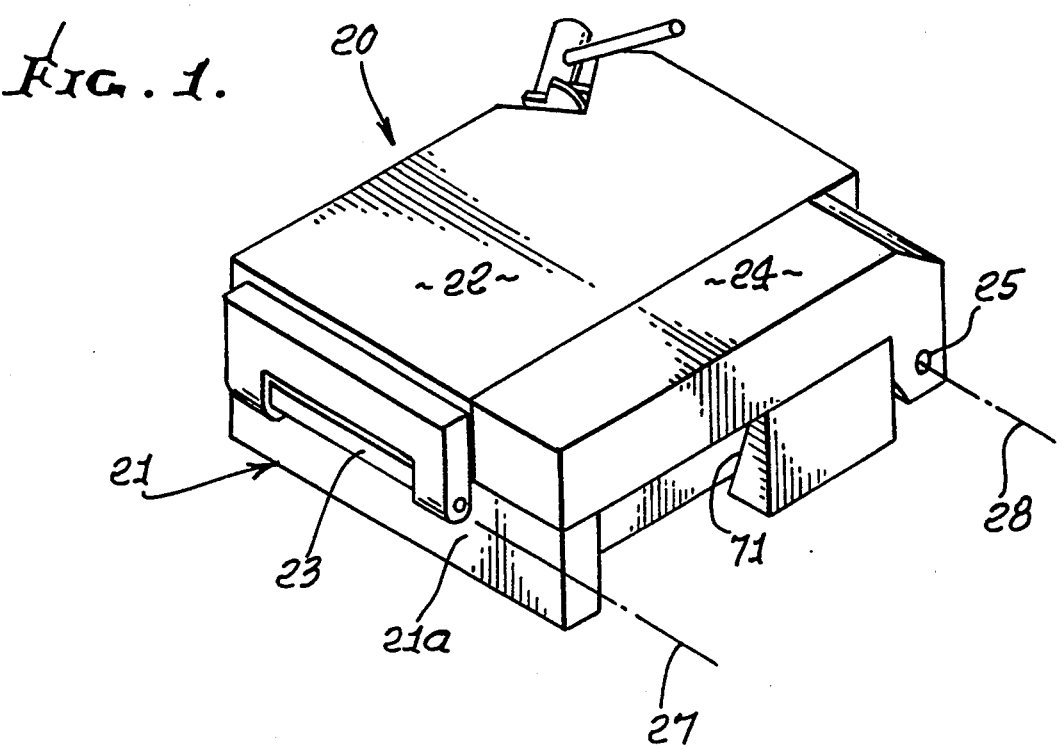
FIG. 1 is a perspective view of mold structure embodying the invention.

Referring first to FIG. 13, the wax pattern 10 to be produced has the shape of a golf club (metal wood) head. The head has surface portions corresponding to those of a metal wood head to be produced using a "lost wax" process, those portions seen in FIG. 13 including a ball-striking face 11, a top 12, heel 13, toe 14, rear 15, and hosel region 16.

Figure 2:
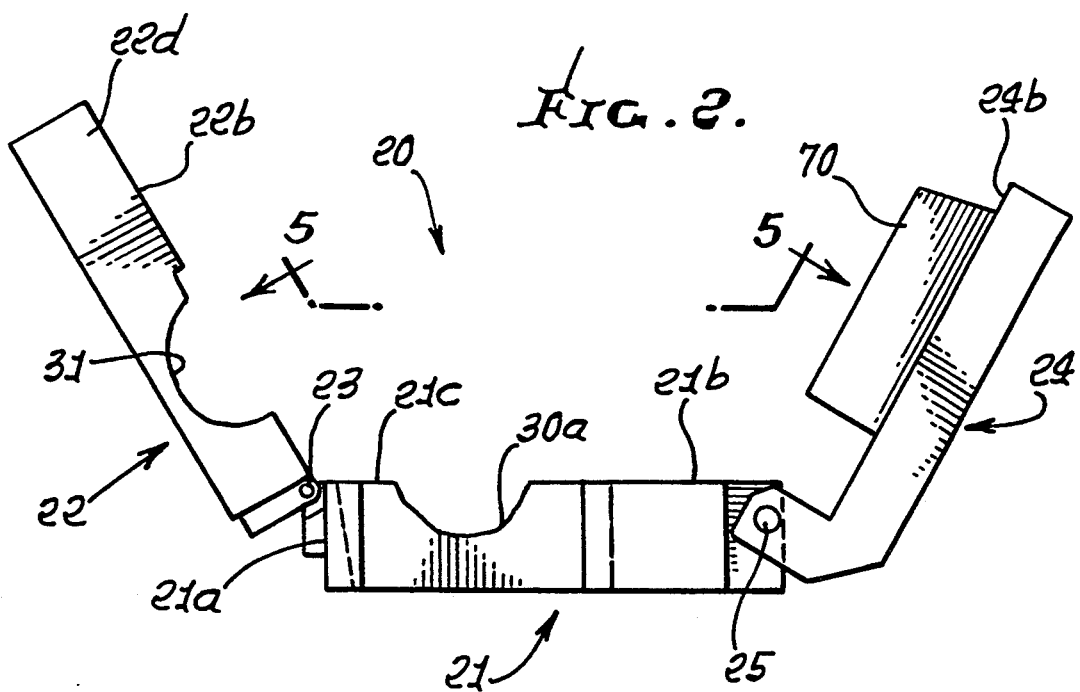
FIG. 2 is a side view of the FIG. 1 structure showing hinged mold parts in opened (lifted) condition.

The mold structure 20 employed, as seen in FIGS. 1 and 2, includes a mold body 21, a first mold cover 22 having hinge or other type connection at 23 to one end portion 21a of body 21; and a second mold cover 24 or other means having hinge or other connection at 25 to the opposite end portion 21b of body 21. Hinge axes 27 and 28 are parallel, as seen in FIG. 1; cover 22 extends over (folds over) one portion 30a of the mold body cavity; and cover 24 extends over (folds over) another portion 30b of the mold body cavity. See also FIGS. 3 and 4 Note cavity 31 in cover 22, that registers with cavity 30a in closed condition of the mold structure. Each of elements 21, 22 and 24 has metallic block form, for example; cover surface 22b, when closed, seats on body surface 21b; and cover surface 24b, when closed, seats on body surface 21c. Also, when the covers are closed, cover side surface 22d lies closely adjacent cover side surface 24d (see FIG. 3), throughout the lengths of the two covers. All covers may be moved by linear translation upwardly, instead of by rotation about hinge or pivot axes.

Figure 3:
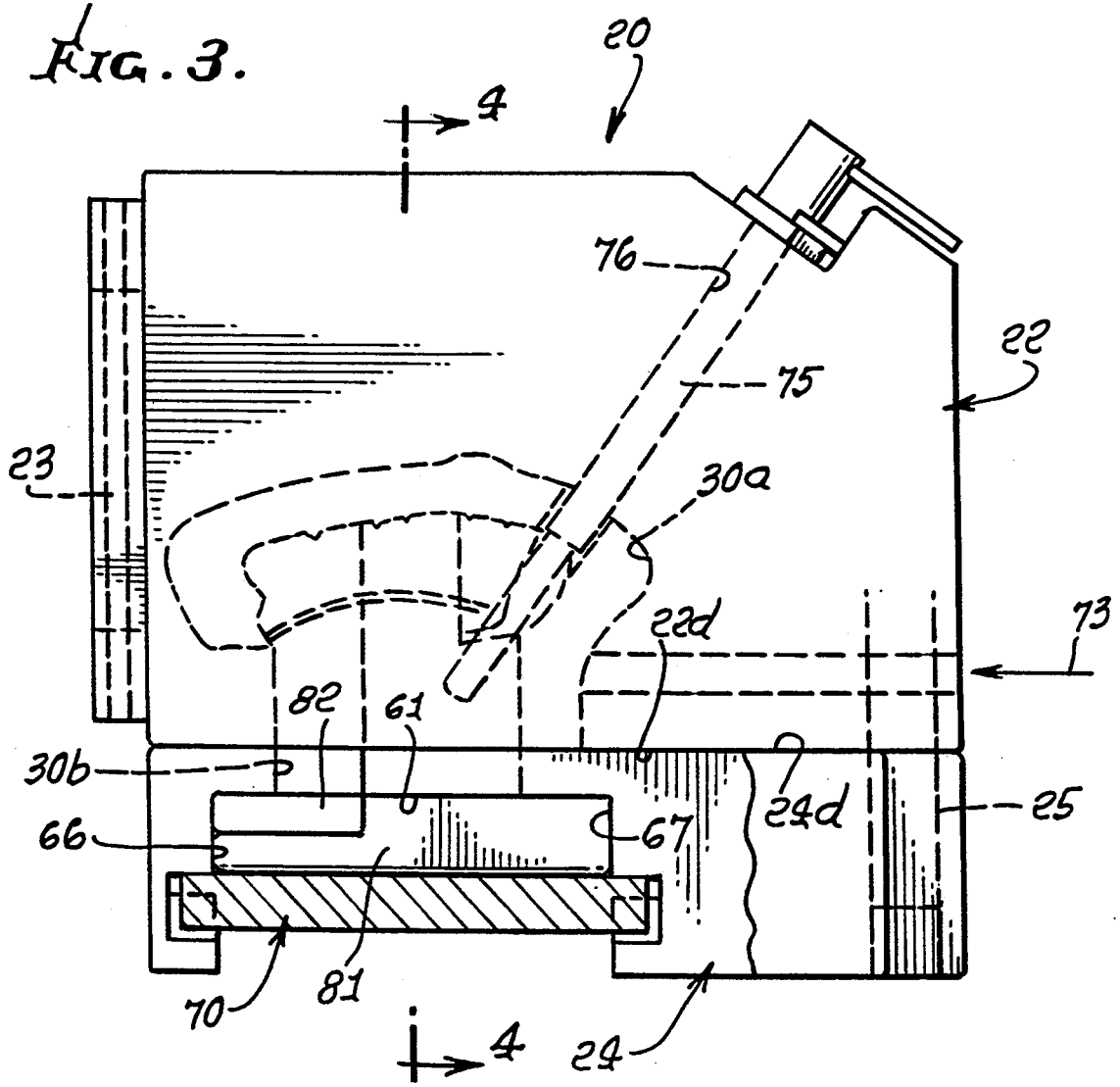
FIG. 3 is an enlarged plan view of the FIG. 1 structure, partly broken away to show the location of wedge means.
Figure 4:
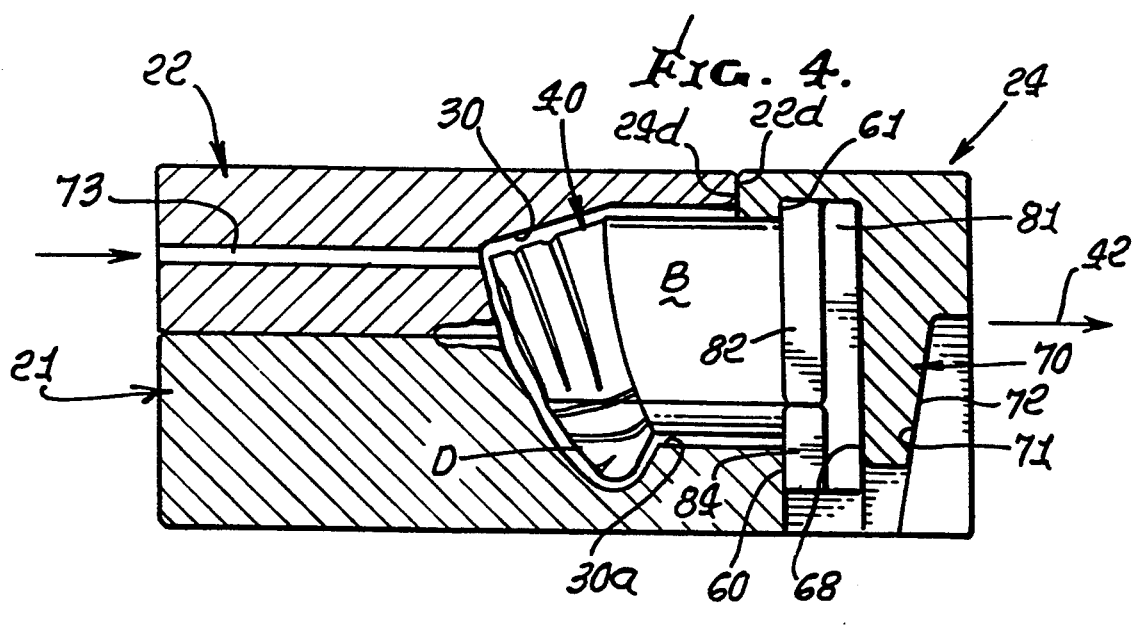
FIG. 4 is an elevation taken on lines 4—4 of FIG. 3.
Figure 5:
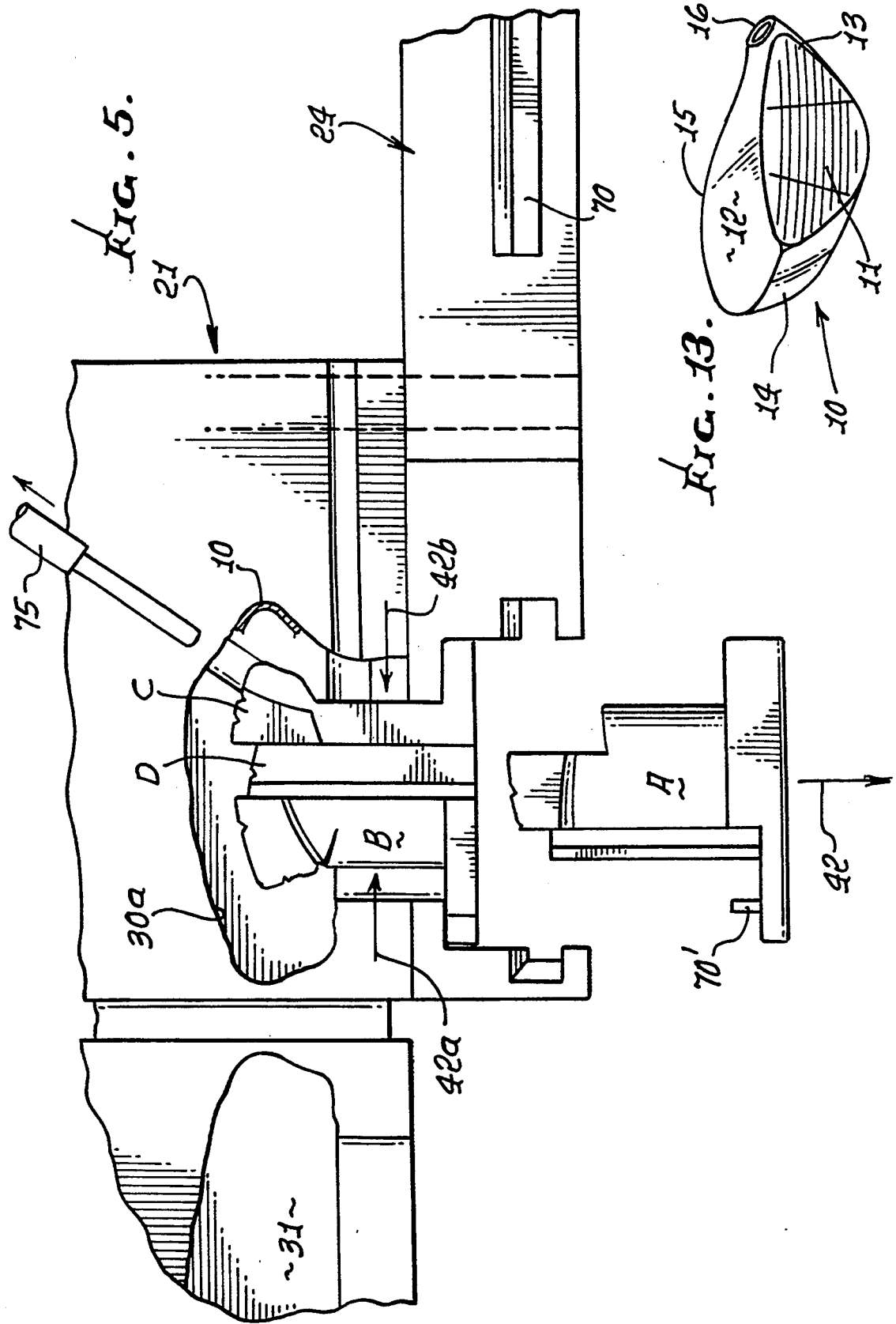
FIG. 5 is an enlarged plan view taken on lines 5—5 of FIG. 2 and showing insert removal.
Figure 6:
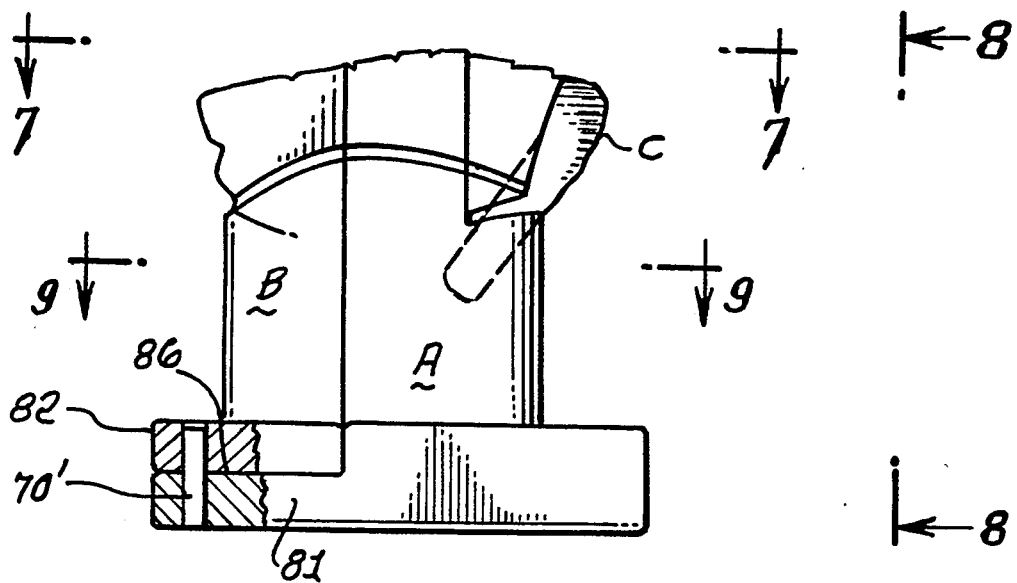
FIG. 6 is a plan view of core or insert structures in assembled condition.

Reference of FIG. 4, as well as to other views, will show the following additional structure: a core or insert assembly 40 is positioned or inserted into the cavity 30 (as in insertion direction 41); and the two covers 22 and 24 are closed to FIGS. 1, 3, and 4 condition. The assembly 40 includes multiple core pieces or parts, as for example are designated at A, B, C, and D (see FIG. 9). Piece A may be considered as a base, and the pieces B, C, and D are assembled to the base, unidirectionally, to allow them to be separately withdrawn from the mold in that direction (see arrow 42) after opening of only one cover, i.e., cover 24. Piece A is removed first, in direction 42, and then pieces B, C and D are removed in direction 42 after external shifting, as in directions 42a and 42b, as seen in FIG. 5. Additional core pieces can be employed.

In this regard, core piece B has tongue and groove connection to A, as at T-tongue 44 and T-groove 45; core piece C has tongue and groove connection to A, as at T-tongue 46 and T-groove 47; and core piece D also has tongue and groove connection to A, as at T-tongue 48 and T-groove 49. Note the interfitting piece side walls 50 and 51, 52 and 53, 53 and 54, 53 and 55, 56 and 57, and 58 and 59. All these walls define planes extending in the direction of arrow 42, allowing the part A to be first removed in direction 42, and the parts B, C, and D to be removed via the cavity remaining after removal of part A.

Figure 7:
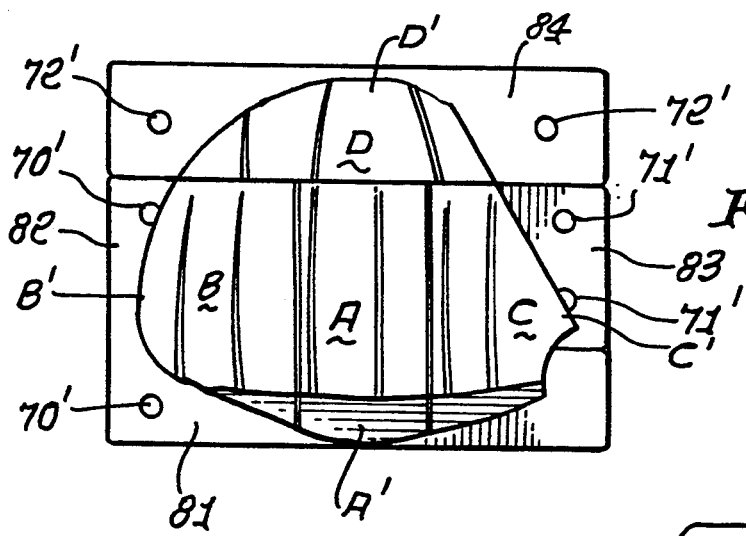
FIG. 7 is an elevation taken on lines 7—7 of FIG. 6.
Figure 8:
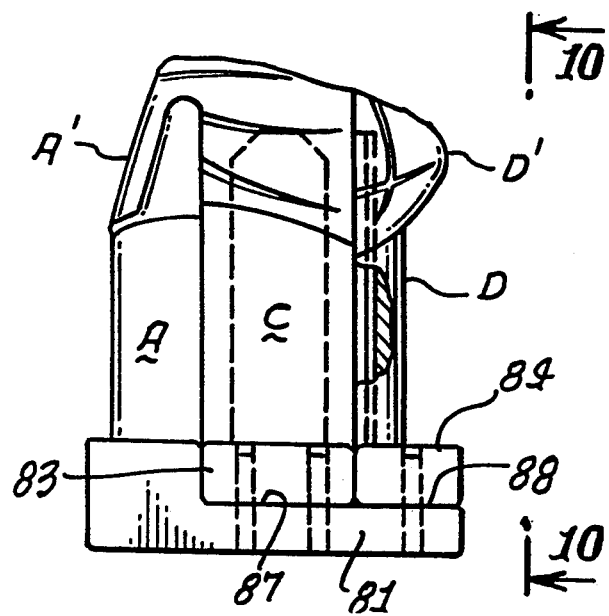
FIG. 8 is an elevation taken on lines 8—8 of FIG. 6.
Figure 12:
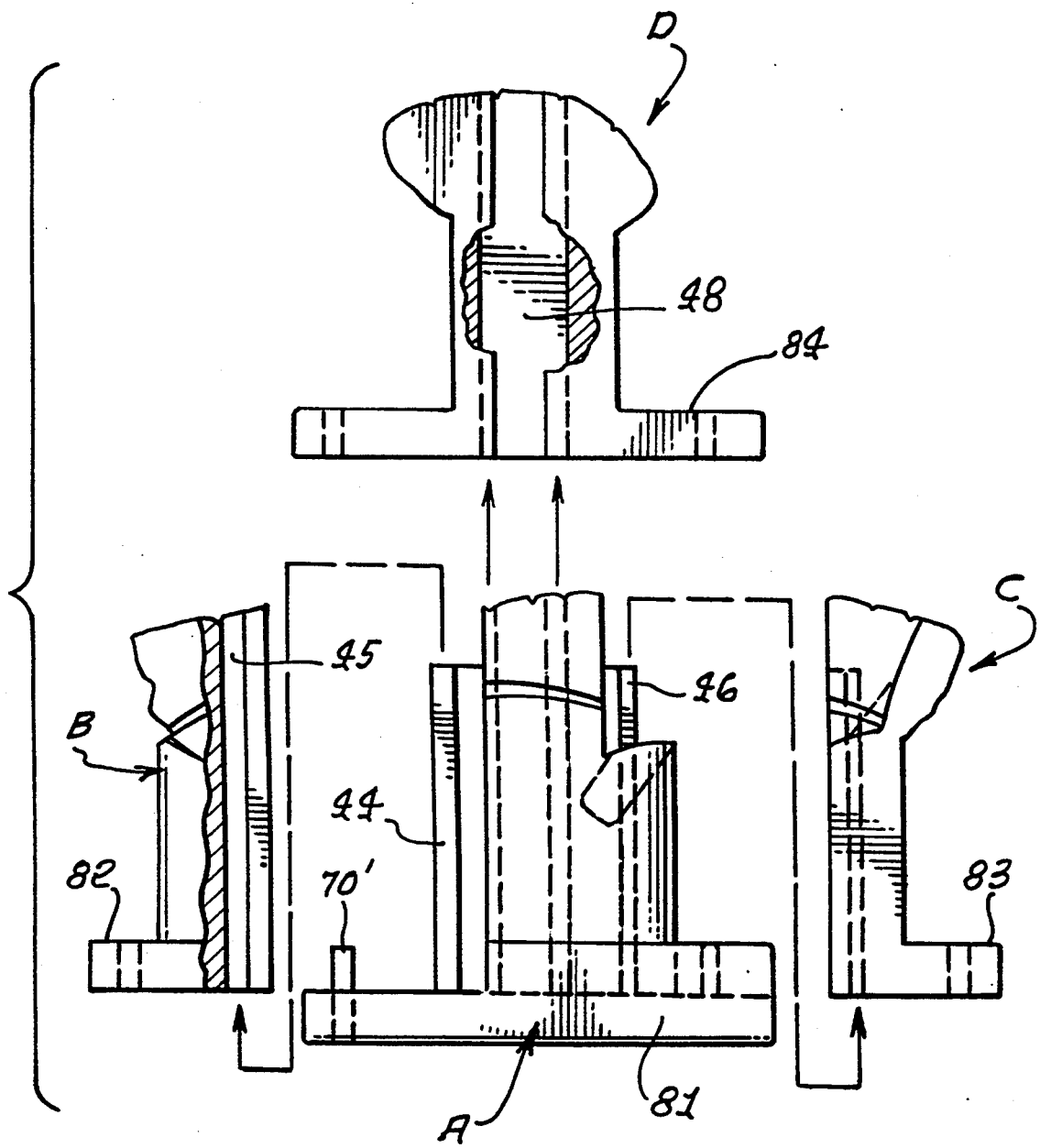
FIG. 12 is an exploded view of the insert parts, as seen from the rear side of the insert, opposite to that of FIG. 9.

In this regard, note portions B', C', and D' that overhang the side walls of A, as in FIG. 7, those portions B', C' and D' having surfaces defining the toe, heel and rear wall of the golf club head to be produced from the wax pattern conforming to B', C' and D'. The golf club head face is to be formed by surface A', of A.

Note also that the core has an integral flange defined for example by the sub-flanges 51–54 on the core parts A–D, respectively. Sub-flange 51, integral with A, also defines a base on which sub-flanges 52–54 seat, as at 56–58, to limit the assembly of the core pieces B, C and D to A. Pins 70–72 extend in direction 42 and interconnect flanges, as shown in FIG. 7. Flanges 51–54 in turn seat against the peripheral shoulders 60 and 61 defined by mold body 20 and by the cover 24 (see FIG. 4) when assembled into the mold in direction 41, and when the cover 24 is closed. See also peripheral guide surfaces 66–68 (FIGS. 3 and 4) defined by the body 21, to guide the flanges as they are finally assembled into the mold, providing a 360° pipe-like "trap" of metal which confines in core the dimensions or axes, against the outer periphery of the core parts A–D, respectively. A wedge 70, integral with the cover 24, or other convenient transport and location mechanism, engages the inner surface 71 of base 21, and snugly pushes the flanges into position, as seen in FIG. 4, engaging 60 and 61, when that cover is closed into position. Note wedge and mold body interengagement surfaces 72 and 71. Thus, the core is positively positioned in the mold cavity (cavities) in wax pattern forming portion of the mold, with metal-to-metal contact of the core flanges with the mold, in all three axes.

The resultant thin-walled cavities formed by the mold base 21 and cover 22, the cores or inserts A–D, is precision dimensioned to receive hot wax as via a port 73.

The space in the club head to be occupied by the golf club shaft is formed by an insert pin 75, during molding. It extends through a bore 76 in the cover 22 (as indicated in FIGS. 1, 3 and 5) and also into the insert D, as shown.

The steps of the wax molding process include
  a) closing the mold with the core means positioned in the mold cavity,
  b) injecting flowing heated wax into the mold to flow about the core,
  c) allowing the injected wax to cool and solidify to form the wax pattern,
  d) removing the core means from the solidified wax pattern, while the mold holds the wax pattern in position fixated in the mold,
  e) and opening the mold and removing the unencumbered wax pattern from the mold.

As referred to above, step d) may typically include opening cover 24 and then removing the core pieces A–D from the club head pattern which remains in mold body 21 and in closed cover 22, so that the pattern becomes a hollow wax shell in the mold (closed parts 21 and 22). As referred to, the positioning step a) includes providing a flange or flanges on the core means, and a stop shoulder on the mold, and wedging the flange or flanges against the stop shoulder during the a) step; and the core assembly is guidably inserted into the mold with core metal-to-mold metal relatively sliding guidance, and fixation in three dimensions.

In the above, in the case of molding a golf club head, the core inserts are removed one-by-one from at portion of the wax pattern that corresponds to the sole of the golf club head; then, after casting of a club metal head, a metal sole plate is attached to the head to enclose the hollow head interior.

I claim:

1. A combination for use in a wax pattern molding process, employing a mold having a cavity and core pieces in the cavity, the combination comprising:
  a) a mold base and two covers removably attached to the base,
  b) the core pieces assembled together in the cavity to define with the mold a space for molding a wax pattern of a golf club head, the pieces removable one-by-one from the mold after removal of only one cover and while the wax pattern is retained in the cavity by the other cover attached to the base,
  c) the core pieces having flanges engageable against locating surfaces defined by the mold, said one cover having a first wedge that urges the flanges against said locating surfaces, when the one cover is closed on the base, the base having a wedge surface engaged by said first wedge when the cover is closed on the base,
  d) there being at least four of said core pieces, A, B, C, and D, pieces B, C and D removable after removal of said piece A, all pieces removable unidirectionally from the mold, said core pieces B, C, D having tongue and groove sliding connection to said core piece A.

* * * * *